(12) United States Patent
Pulikanti et al.

(10) Patent No.: US 10,707,696 B2
(45) Date of Patent: Jul. 7, 2020

(54) UPS WITH SOURCE IMPEDANCE COMPENSATION

(71) Applicant: ABB Schweiz AG, Baden (CH)

(72) Inventors: Sridhar Pulikanti, Napier (NZ); Simon James Walton, Napier (NZ); Robert Turner, Hastings (NZ); NIck Elliott, Havelock North (NZ)

(73) Assignee: ABB Schweiz AG, Baden (CH)

( * ) Notice: Subject to any disclaimer, the term of this patent is extended or adjusted under 35 U.S.C. 154(b) by 149 days.

(21) Appl. No.: 15/856,867

(22) Filed: Dec. 28, 2017

(65) Prior Publication Data
US 2018/0145538 A1      May 24, 2018

Related U.S. Application Data

(63) Continuation of application No. PCT/EP2016/065174, filed on Jun. 29, 2016.

(30) Foreign Application Priority Data

Jun. 29, 2015   (EP) .................................... 15174241

(51) Int. Cl.
H02J 9/06        (2006.01)
H02J 3/12        (2006.01)

(52) U.S. Cl.
CPC ................. *H02J 9/062* (2013.01); *H02J 3/12* (2013.01); *H02J 9/068* (2020.01)

(58) Field of Classification Search
CPC ......... H02J 3/12; H02J 2009/068; H02J 9/062
See application file for complete search history.

(56) References Cited

U.S. PATENT DOCUMENTS 5,172,009 A    12/1992  Mohan
6,215,202 B1    4/2001  Luongo et al.
(Continued)

FOREIGN PATENT DOCUMENTS

AU    2012212276 A1    1/2015
DE      60105085 T2    1/2005

OTHER PUBLICATIONS

European Patent Office, International Search Report & Written Opinion issued in corresponding Application No. PCT/EP2016/065174, dated Aug. 30, 2016, 10 pp.
(Continued)

*Primary Examiner* — Alfonso Perez Borroto
*Assistant Examiner* — Esayas G Yeshaw
(74) *Attorney, Agent, or Firm* — J. Bruce Schelkopf; Taft Stettinius & Hollister LLP

(57) ABSTRACT

The present invention provides a method for operation of an offline uninterrupted power supplyfor providing power to a load in case of failure of a power source, the uninterrupted power supply comprising at least one disconnect switch, which is arranged between the power source and the load, at least one energy storage, at least one power converter, which is arranged between the at least one energy storage and the load at a load side of the disconnect switch, and a control device for controlling the at least one power converter to provide power from the at least one energy storage to the load in case of failure of the power source, comprising the steps of identifying a power quality event, differentiating the identified power quality events to separate load side events from power supply side quality events, and upon identification of a power supply side power quality event from an identified power quality event, providing power from the at least one energy storage to the load. The present invention also provides a offline uninterrupted power supply, in par-
(Continued)

ticular a medium-voltage uninterrupted power supply, to perform the above method.

15 Claims, 1 Drawing Sheet

(56) References Cited

U.S. PATENT DOCUMENTS

| | | | | |
|---|---|---|---|---|
| 8,898,278 | B2* | 11/2014 | Bridges | B60L 53/57 |
| | | | | 709/224 |
| 9,658,665 | B2* | 5/2017 | Chapel | G06F 1/3287 |
| 2008/0088183 | A1 | 4/2008 | Eckroad et al. | |
| 2008/0270048 | A1* | 10/2008 | van Zyl | H02P 9/105 |
| | | | | 702/57 |
| 2015/0236548 | A1* | 8/2015 | Larson | H02J 9/06 |
| | | | | 307/64 |
| 2017/0085085 | A1* | 3/2017 | Pieschel | H02J 3/1864 |
| 2018/0034280 | A1* | 2/2018 | Pedersen | H02J 5/00 |

OTHER PUBLICATIONS

European Patent Office, Extended Search Report issued in corresponding Application No. 15174241.8, dated Sep. 23, 2015, 7 pp.
Indian Patent Office, Examination Report in corresponding application No. 201747046769, dated Oct. 11, 2019, 6 pp.

* cited by examiner

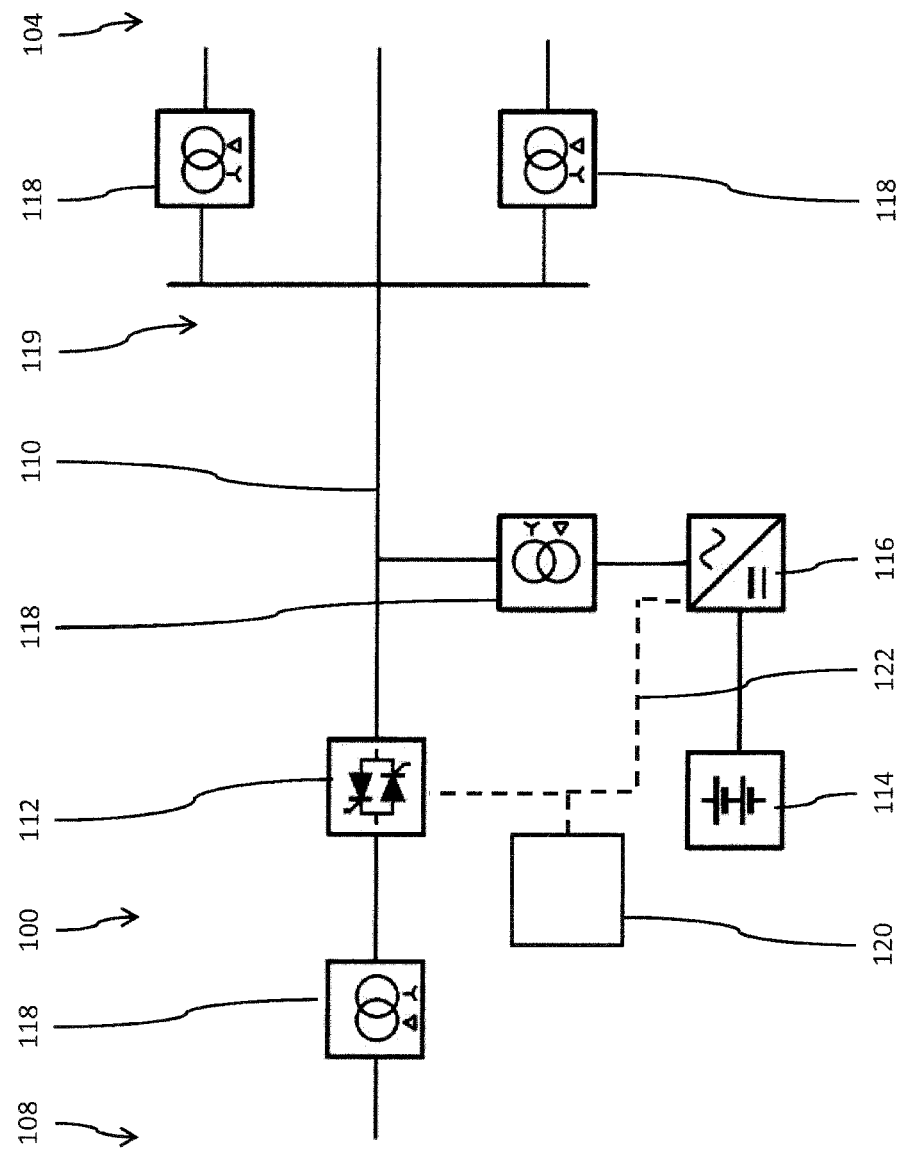

UPS WITH SOURCE IMPEDANCE COMPENSATION

TECHNICAL FIELD

The present invention relates to the area of offline uninterruptible power supplies. In particular, the present invention refers to a method for operation of an offline uninterrupted power supply, in particular a medium-voltage uninterrupted power supply, for providing power to a load in case of failure of a power source.

BACKGROUND ART

In three-phase medium voltage (MV) distribution networks, electric energy is distributed to different loads through low-voltage (LV) network feeders. The loads are connected to the feeders and could be protected using traditional LV uninterruptible power supplies (UPS). However, connecting UPS in each feeder is expensive, consumes much space, requires much maintenance, provides low overall efficiency and requires complex supervisory control. The protection of loads from upstream power quality events at medium voltage level overcomes most of the above mentioned disadvantages. Medium voltage uninterruptible power supply (MV-UPS) equips better protection mechanism for loads at MV level. Most of the existing MV-UPS use on-line UPS system technology in which AC/DC/AC conversion continuously takes place in the UPS, so that utility disturbances, e.g. failures of the power source, can be isolated from the loads.

To improve efficiency and reliability and to reduce costs, the online UPS system technology can be replaced with MV offline-UPS system technology. Offline-UPS are commonly used for power protection in industrial environments where efficiency and footprint are primary cost drivers.

In offline-UPS systems, a load, which is provided at a downstream side, is directly connected by a power bus to a power source, which is provided at an upstream side, as incoming utility supply, whereby a disconnect switch, also referred to as utility disconnect, is provided in the power bus. The power source is typically a grid supply. The offline-UPS comprise an energy storage, which is connected via a power converter to the power bus downstream of the disconnect switch.

When the offline-UPS detects a voltage disturbance, also referred to as power quality event, in the power source, the offline-UPS transfers the downstream load to backup energy storage through the power converter. Hence, the disconnect switch disconnects the load from the power source and power from the energy storage is provided via the power converter to the power bus, so that the downstream load can remain operational during the power quality event. This process of disconnecting the power source by switching off the disconnect switch and transferring the load support to the power converter with the energy storage is known as a transfer. In order to enable reliable and continuous power supply to the load also in case of power quality events, one of the most important functionalities of the MV offline-UPS is identifying power quality events.

However, in three-phase MV offline-UPS, identifying an upstream power quality event is a critical task. The utility supply voltage from the power source is sensitive to downstream load disturbances, downstream load harmonics and downstream faults due to downstream current and network impedance interaction.

Due to downstream faults, a downstream current can build up whose effect on network impedance may cause the utility voltage from the power source to violate the MV network voltage tolerance limits. This may allow the MV offline-UPS to detect a power quality event and transfer downstream load to the backup from the energy storage. Accordingly, a false detection of a power quality event may occur. This may decreases life-span of the offline-UPS due to unnecessarily increased operational time. This yields to increased efforts for maintenance and service.

Furthermore, due to high downstream currents, the MV offline-UPS may reach overload current limits, which allows it to take a decision on shedding the downstream load. Hence, there is a risk of load shedding under downstream fault detection.

MV distribution network with high downstream harmonics loads can produce significant utility voltage distortion allowing the offline-UPS to trigger a power quality event.

Further disadvantage of utility supply voltage sensitivity to downstream load disturbances, downstream load harmonics and downstream faults is inaccurate tracking of utility supply voltages.

In this context, US 2008/088183 A1 refers to a method and an apparatus for providing substantially uninterrupted power to a load. The apparatus includes a control system coupled with an electrical power storage subsystem and an electrical power generator. The control system is configured to provide a plurality of modes of operation including at least a static compensator (STATCOM) mode, an uninterruptible power supply (UPS) mode and a generator mode (gen set), and to control transitions between each of the plurality of modes. The control system is an integrated closed loop control system that includes a current control system and a voltage control system.

Furthermore, document U.S. Pat. No. 6,215,202 B1 refers to a shunt connected superconducting energy management system (SEMS). The SEMS is provided at a single switched connection between a utility grid and one or more power sensitive loads such as a semiconductor manufacturing plant having power requirements in the range on the order of 2 megawatts (MW) to 200 MW.

Still further, U.S. Pat. No. 5,172,009 A refers to a standby power supply system for supplying normal AC power to a critical load from an AC power source during normal operating conditions, and for supplying emergency AC power to the load during failure of the AC power source. During normal operation, the standby power supply system actively neutralizes undesirable harmonic components in the input current drawn by the load. The standby power supply system includes a power conversion device having a DC side coupled to a back-up power source and an AC side in parallel with the load and the AC source. A harmonic distortion sensor senses a harmonic distortion current component of a load current drawn by the load during normal operating conditions. A controller is responsive to the harmonic distortion sensor for causing the power conversion device to produce a harmonics neutralizing current to substantially neutralize the harmonic distortion current component produced by the load.

DISCLOSURE OF INVENTION

It is an object of the present invention to provide a method for operation of an offline uninterrupted power supply and an offline uninterrupted power supply for performing the method, which overcome at least some of the above disadvantages of offline UPS known in the Art. In particular, it is an object of the present invention to provide a method for operation of an offline uninterrupted power supply and an offline uninterrupted power supply for performing the method, which improves the overall performance of the offline-UPS, and/or which reduces sensitivity to downstream load disturbances, downstream load harmonics and downstream faults due to downstream current and network impedance interaction, and/or which reduces a false detection of a power quality event, and/or which increases life-span of the offline-UPS, which requires reduced maintenance and service, and/or which shows a reduced risk of load shedding under downstream fault detection.

This object is achieved by the independent claims. Advantageous embodiments are given in the dependent claims.

In particular, the present invention provides a method for operation of an offline uninterrupted power supply, in particular a medium-voltage uninterrupted power supply, for providing power to a load in case of failure of a power source, the uninterrupted power supply comprising at least one disconnect switch, which is arranged between the power source and the load, at least one energy storage, at least one power converter, which is arranged between the at least one energy storage and the load at a load side of the disconnect switch, and a control device for controlling the at least one power converter to provide power from the at least one energy storage to the load in case of failure of the power source, comprising the steps of identifying a power quality event, differentiating the power quality events to separate load side events from power supply side quality events, and upon identification of a power supply side power quality event from an identified power quality event, providing power from the at least one energy storage to the load, and performing network impedance compensation in respect to the load, whereby the step of differentiating the power quality events to separate load side events from power supply side quality event comprises using network impedance compensated utility voltage and load current.

The present invention also provides an offline uninterrupted power supply, in particular a medium-voltage uninterrupted power supply, for providing power to a load in case of failure of a power source, the uninterrupted power supply comprising at least one disconnect switch, which is arranged between the power source and the load, at least one energy storage, at least one power converter, which is arranged between the at least one energy storage and the load at a load side of the disconnect switch, and a control device for controlling the at least one power converter to provide power from the at least one energy storage to the load in case of failure of the power source, whereby the control device is adapted to perform the above method.

The present invention further provides a computer program product comprising computer executable instructions to perform the above method.

The present invention still further provides a software package for upgrading an offline uninterruptible power supply, whereby the software package contains instructions for controlling the offline uninterruptible power supply to perform the above method.

The basic idea of the invention is to enable a reliable detection of upstream power quality events. This includes e.g. a distinction between upstream power quality events and downstream events, which are caused in particular by the load, e.g. when the load is activated and starts drawing power from the power source. Hence, when a power quality event is detected, a differentiation is performed to distinguish between load side events and power supply side quality events. Only in case the power quality event is identified as a power supply side power quality event, a transfer of the power supply from the power source to the energy storage is performed, so that power from the energy storage is provided to the load.

Accordingly, power supply from of the offline-UPS to the load can be limited to cases of the power quality event being a power supply side or upstream power quality event. Furthermore, false detections of a power quality event can be reduced or even avoided. This may increases life-span of the offline-UPS due to a reduced activation time. This yields to reduced efforts for maintenance and service. Also the risk of shedding the downstream load under downstream fault detection can be reduced, and accuracy in tracking of utility supply voltages as provided from the power source can be improved.

Advantages of the invention comprise enhancements of the offline-UPS in a rejection of momentary voltage disturbances due to passive load switching or voltage distortions due to start-up process of rotatory machines, identification of downstream feeder faults allowing MV distribution network to clear the faults, identification of power quality events in scenarios like load back-feeding to the power source at the time of power quality event, and increased accuracy in tracking MV distribution network voltages. The network refers to a distribution network for distributing electric energy to different loads. The electric energy is preferably provided to the different loads through low-voltage (LV) network feeders. Hence, the network comprises the power bus.

A still further advantage is that the method can be implemented in different offline-UPS topologies comprising e.g. different kinds of energy storages and/or different architectures of the offline UPS. Furthermore, the method can also be implemented in existing offline-UPS by a mere change of software, in particular a control software of the control device. Hence, existing offline-UPS can be easily improved according to the present invention.

In systems comprising an offline-UPS, the load is provided at a downstream side of the offline-UPS and directly connected to the power source, which is provided at an upstream side of the offline-UPS as incoming utility supply, typically a grid supply. The connection between the load and the power source is achieved by a power bus, which may comprise cables or rails. Since the power bus typically refers to an existing system installation, it is typically not considered as part of the offline-UPS, although the offline-UPS also comprises cables and/or bus bars for providing electrical power connections.

The control device for controlling the at least one power converter can be provided integral with the at least one power converter or as a separate device, depending on the system design. The control device performs a control of the entire offline UPS. Independently, the different components of the offline UPS, in particular the at least one power converter, may comprise individual control units for performing an internal control of the respective components. The control device may be provided integrally with one of the components of the offline-UPS.

The utility voltage refers to the voltage provided from the power source. This enables an estimation of voltage distortion caused by load disturbances, harmonic loads, and downstream faults on an impedance of a medium voltage distribution network. The network impedance compensation also reduces utility supply voltage sensitivity to downstream load disturbances, downstream load harmonics and downstream faults, so that tracking accuracy of utility supply voltages is increased.

The network refers to a distribution network for distributing electric energy to the load comprising the power bus. The electric energy is preferably provided to the load through low-voltage (LV) network feeders.

According to a modified embodiment of the invention the step of performing network impedance compensation in respect to the load comprises performing an impedance measurement of the network. Accordingly, the impedance can be determined at any time to be always up-to-date, so that a compensation of the impedance can be reliably performed. Alternatively, the network impedance can e.g. be derived from the network design. Methods for performing impedance measurements per se are known and therefore not discussed in detail.

According to a modified embodiment of the invention the step of performing network impedance compensation comprises desensitizing the effect on utility voltage as provided from the power source by estimating the voltage distortion due to act of downstream load disturbances, downstream load harmonics and downstream faults on network impedance. The network impedance compensation as described here enables a reliable distinction between power quality events, which are based on effects occurring on the downstream side of the offline-UPS, and upstream power quality events, which require an intervention of the offline-UPS, i.e. which require a transfer from the power source to the power supply from the at least one energy storage via the at least one power converter. Hence, the control device can perform a detection of power quality events, which are post-processed in order to identify the upstream power quality events, or the detection of power quality events itself can be modified, so that only upstream power quality events are detected.

According to a modified embodiment of the invention the step of providing power from the at least one energy storage to the load comprises separating the power supply from the load using the at least one disconnect switch. The separation of the load from the power source enables an efficient transfer of the power supply from the power source to the energy storage.

BRIEF DESCRIPTION OF DRAWINGS

These and other aspects of the invention will be apparent from and elucidated with reference to the embodiments described hereinafter.

In the drawings:

FIG. 1 shows a schematic drawing of an offline uninterruptible power supply according to a first embodiment.

DETAILED DESCRIPTION OF THE INVENTION

FIG. 1 shows an offline uninterruptible power supply 100 (offline-UPS) in accordance with a first, preferred embodiment of the present invention. The offline-UPS 100 according to the first embodiment is a medium-voltage uninterrupted power supply.

For operation, the offline-UPS 100 is connected at a downstream side 104, also referred to as load side, to a load and at an upstream side 108, also referred to as power supply side, to a power source. Load and power source are not shown in the figures. The power source in this embodiment is a grid supply, which provides a utility voltage. The load and the power supply are interconnected by a power bus 110, which comprise cables or bus bars. The power bus 110 in this embodiment is considered as part of the offline-UPS 100, although the power bus 110 can also be part of a system installation for interconnecting the power source and the load. In this respect, it is to be noted that the load may comprise individual load units, which are individually connected to the power bus 110. The load units together form the load.

The offline-UPS 100 comprises a disconnect switch 112, which is arranged in the power bus 110 between the power source and the load. The offline-UPS 100 further comprises an energy storage 114 and a power converter 116, whereby the power converter 116 connects the energy storage 114 to the power bus 110. The power converter 116 is connected at a downstream side 104 of the disconnect switch 112 to the power bus 110.

Still further, the offline-UPS 100 in this embodiment comprises several coupling transformers 118, which are provided to perform voltage adaptations as required. One coupling transformer 118 is provided between the power converter 116 and the power bus 110. A further coupling transformer 118 is provided at an upstream side of the disconnect switch 112. Further coupling transformers 118 are provided at the downstream side of the power bus 110 to perform voltage adaptation for the connected load. The coupling transformers 118 connecting the load units are also referred to as network feeders or feeders.

The connection of the load to the offline-UPS 100 together with the power bus 110 forms a network 119, in particular a distribution network, for distributing electric energy to the load, i.e. to the load units. Hence, the network 119 comprises the power bus 110.

According to the first embodiment, the offline-UPS 100 also comprises a control device 120. The control device 120 performs a control of the entire offline UPS 100. The control device 120 in this embodiment is provided as an individual device. In an alternative embodiment, the control device 120 is provided integral with the power converter 116.

A communication link 122 interconnects the disconnect switch 112, the power converter 116, and the control device 120. The communication link 122 is an industrially robust, low-latency and/or long-distance communication link. The communication link 122 is provide as a communication bus, to which all components of the offline-UPS 100 are connected to. In an alternative embodiment, all components of the offline-UPS 100 are individually connected to the control device 120. The communication link 122 comprises a physical link based on fiber-optic. Alternatively, the physical link is based on a twisted-pair connection. The communication link 122 enables a high speed, long distance communication link 122 with low-latency. In this embodiment, a custom communication protocol is implemented. In an alternative embodiment, an existing industry communication protocol is employed.

Subsequently the operation of the offline-UPS 100 will be discussed.

The basic operation of the offline-UPS 100 is providing power from the energy storage 114 to the load in case of a power quality event, e.g. a failure of the power source. The power quality event comprises any event, that might endanger the operation of the load, in particular voltage drops, complete failures of the power source, or voltage disturbances in the power source.

The control device 120 continuously monitors the power source for power quality events. In contrast to an online-UPS, the offline UPS 100 is passive as long as no power quality event has been detected. In case the control device 120 detects a power quality event, the control device 120 performs a transfer of power supply from the power source to the energy storage 114 via the power converter 116. During transfer, the control device 120 separates the power supply from the load using the disconnect switch 112 and activates the power converter 116 to support the load.

Upon identification of a power quality event, the control device 120 differentiates the power quality events to separate load side events from power supply side quality events. Load side events are events, which are caused in particular by the load, e.g. when the load is activated and starts drawing power from the power source. Accordingly, momentary voltage disturbances due to passive load switching or voltage distortions due to start-up process of rotatory machines, which are part of the load can be overcome, thereby e.g. allowing identification of downstream feeder faults, so that the distribution network 119 at the load side 104 can clear the fault.

This comprises performing network impedance compensation in respect to the load. Accordingly, when differentiating the power quality events to separate load side events from power supply side quality event comprises using network impedance compensated utility voltage and load current. The utility voltage refers to the voltage provided from the power source. Hence, an estimation of voltage distortion caused by load disturbances, harmonic loads, and downstream faults on an impedance of the distribution network is performed. Basis for the network impedance compensation is an impedance measurement of the network 119, which is performed together with the step of network impedance compensation.

Performing network impedance compensation also comprises desensitizing the effect on utility voltage as provided from the power source by estimating the voltage distortion due to act of downstream load disturbances, downstream load harmonics and downstream faults on network impedance. This network impedance compensation is the basis for distinction between power quality events, which are based on effects occurring on the downstream side 104 of the offline-UPS 100, and upstream power quality events, which require an intervention of the offline-UPS 100, i.e. which require a transfer from the power source to the power supply from the energy storage 114 via the power converter 116.

Further, upon identification of a power supply side power quality event from an identified power quality event, the control device 120 performs the transfer of power supply from the power source to the energy storage 114 via the power converter 116, as described above.

While the invention has been illustrated and described in detail in the drawings and foregoing description, such illustration and description are to be considered illustrative or exemplary and not restrictive; the invention is not limited to the disclosed embodiments. Other variations to be disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting scope.

REFERENCE SIGNS LIST 100 offline uninterruptible power supply, offline-UPS
104 downstream side, load side
108 upstream side, power supply side
110 power bus
112 disconnect switch
114 energy storage
116 power converter
118 coupling transformer
119 network
120 control device
122 communication link

The invention claimed is:

1. A method for providing power to a load in case of failure of a power source, the method comprising:
    operating an offline uninterrupted power supply including at least one disconnect switch, which is arranged between the power source and the load, at least one energy storage, at least one power converter, which is arranged between the at least one energy storage and the load at a load side of the disconnect switch, and a control device for controlling the at least one power converter to provide power from the at least one energy storage to the load in case of failure of the power source;
    identifying a power quality event;
    differentiating the identified power quality events to separate load side events from power supply side quality events;
    upon identification of a power supply side power quality event from an identified power quality event, providing power from the at least one energy storage to the load; and
    performing network impedance compensation in respect to the load,
    wherein the step of differentiating the power quality events to separate load side events from power supply side quality events comprises using network impedance compensated utility voltage and load current.

2. The method according to claim 1, wherein the step of performing network impedance compensation in respect to the load comprises performing an impedance measurement of the network.

3. The method according to claim 1, wherein the step of performing network impedance compensation comprises desensitizing the effect on utility voltage as provided from the power source by estimating the voltage distortion due to act of downstream load disturbances, downstream load harmonics and downstream faults on network impedance.

4. The method according to claim 1, wherein the step of providing power from the at least one energy storage to the load comprises separating the power supply from the load using the at least one disconnect switch.

5. An offline uninterrupted power supply for providing power to a load in case of failure of a power source, the uninterrupted power supply comprising:
    at least one disconnect switch, which is arranged between the power source and the load,
    at least one energy storage,
    at least one power converter, which is arranged between the at least one energy storage and the load at a load side of the disconnect switch,
    and a control device for controlling the at least one power converter to provide power from the at least one energy storage to the load in case of failure of the power source, wherein the control device is adapted to perform the following:
identify a power quality event,
differentiate the identified power quality events to separate load side events from power supply side quality events,
upon identification of a power supply side power quality event from an identified power quality event, provide power from the at least one energy storage to the load, and
perform network impedance compensation in respect to the load, and
wherein the step of differentiating the power quality events to separate load side events from power supply side quality events comprises using network impedance compensated utility voltage and load current.

6. The offline uninterrupted power supply according to claim 5, wherein the step of performing network impedance compensation in respect to the load comprises performing an impedance measurement of the network.

7. The offline uninterrupted power supply according to claim 5, wherein the step of performing network impedance compensation comprises desensitizing the effect on utility voltage as provided from the power source by estimating the voltage distortion due to act of downstream load disturbances, downstream load harmonics and downstream faults on network impedance.

8. The offline uninterrupted power supply according to claim 5, wherein the step of providing power from the at least one energy storage to the load comprises separating the power supply from the load using the at least one disconnect switch.

9. An offline uninterrupted power supply control device for operation an offline uninterrupted power supply including at least one disconnect switch, which is arranged between the power source and the load, at least one energy storage, at least one power converter, which is arranged between the at least one energy storage and the load at a load side of the disconnect switch, the control device comprising:
a set of instructions that when executed are structured so as to:
identify a power quality event,
differentiate the identified power quality events to separate load side events from power supply side quality events,
upon identification of a power supply side power quality event from an identified power quality event, provide power from the at least one energy storage to the load by operating the power converter, and
perform network impedance compensation in respect to the load, and
wherein the step of differentiating the power quality events to separate load side events from power supply side quality events comprises using network impedance compensated utility voltage and load current.

10. The offline uninterrupted power supply control device according to claim 9, wherein the step of performing network impedance compensation in respect to the load comprises performing an impedance measurement of the network.

11. The offline uninterrupted power supply control device according to claim 9, wherein the step of performing network impedance compensation comprises desensitizing the effect on utility voltage as provided from the power source by estimating the voltage distortion due to act of downstream load disturbances, downstream load harmonics and downstream faults on network impedance.

12. The offline uninterrupted power supply control device according to claim 9, wherein the step of providing power from the at least one energy storage to the load comprises separating the power supply from the load using the at least one disconnect switch.

13. The method according to claim 2, wherein the step of performing network impedance compensation comprises desensitizing the effect on utility voltage as provided from the power source by estimating the voltage distortion due to act of downstream load disturbances, downstream load harmonics and downstream faults on network impedance.

14. The method according to claim 2, wherein the step of providing power from the at least one energy storage to the load comprises separating the power supply from the load using the at least one disconnect switch.

15. The method according to claim 3, wherein the step of providing power from the at least one energy storage to the load comprises separating the power supply from the load using the at least one disconnect switch.

* * * * *